United States Patent
Williams et al.

(10) Patent No.: US 7,438,344 B2
(45) Date of Patent: Oct. 21, 2008

(54) CONVERTIBLE TOP WEATHER STRIP

(75) Inventors: Paxton S. Williams, Milan, MI (US); Greg Bernas, Brighton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/566,867

(22) Filed: Dec. 5, 2006

(65) Prior Publication Data
US 2008/0129075 A1  Jun. 5, 2008

(51) Int. Cl.
*B60J 10/10* (2006.01)

(52) U.S. Cl. ............... 296/107.05; 296/107.04; 296/213

(58) Field of Classification Search ............ 296/107.07, 296/107.04, 107.05, 135, 154, 213, 146.9; 49/476.1
See application file for complete search history.

(56) References Cited

U.S. PATENT DOCUMENTS

| | | | |
|---|---|---|---|
| 2,253,818 A | | 8/1941 | Simpson |
| 2,686,691 A | | 8/1954 | Burrell |
| 3,938,856 A | | 2/1976 | Janssen et al. |
| 4,272,120 A | * | 6/1981 | Katayama et al. ........... 296/210 |
| 4,729,593 A | | 3/1988 | Nisiguchi et al. |
| 4,919,471 A | * | 4/1990 | Seino et al. ................. 296/154 |
| 5,009,464 A | | 4/1991 | Hasegawa et al. |
| 5,106,146 A | | 4/1992 | Hanlon |
| 5,106,149 A | * | 4/1992 | Glossop et al. .............. 296/213 |
| 5,209,546 A | | 5/1993 | Hasegawa et al. |
| 5,474,729 A | * | 12/1995 | Yada ........................... 264/167 |
| 5,848,819 A | * | 12/1998 | Sautter, Jr. .............. 296/107.07 |
| 6,010,177 A | * | 1/2000 | Fujita et al. ............. 296/107.04 |
| 6,030,022 A | | 2/2000 | Bormann et al. |
| 6,189,950 B1 | * | 2/2001 | Kawazoe et al. ........ 296/107.04 |
| 6,213,536 B1 | * | 4/2001 | Raisch et al. ............. 296/146.9 |
| 6,648,405 B2 | | 11/2003 | Bunsmann et al. |
| 2002/0038961 A1 | * | 4/2002 | Halbweiss et al. ...... 296/107.07 |
| 2005/0127707 A1 | | 6/2005 | Tsuchida |
| 2005/0200157 A1 | * | 9/2005 | Morihara ................ 296/107.04 |
| 2006/0097541 A1 | * | 5/2006 | Olney et al. ............. 296/107.04 |

FOREIGN PATENT DOCUMENTS

| | | |
|---|---|---|
| DE | 3530556 | 3/1987 |
| JP | 63-166667 | 7/1988 |

* cited by examiner

*Primary Examiner*—D. Glenn Dayoan
*Assistant Examiner*—Greg Blankenship
(74) *Attorney, Agent, or Firm*—Gifford, Krass, Sprinkle, Anderson & Citkowski, P.C.

(57) ABSTRACT

A sealing or weather strip for attachment to a convertible top of an automotive vehicle, the strip having an upwardly facing, generally C-shaped channel for receiving water from the top during rainy weather or during washing of the vehicle. The strip further has an upwardly extending leg of substantial longitudinal extent and an outwardly projecting bump of limited longitudinal extent on the leg to position other portions of the leg away from the convertible top. The bump is spaced from the channel and vertically above at least major portions of the channel, thereby requiring capillary action to cause water to flow along an outside portion of the leg into the channel. The leg forms a pocket for sealingly receiving an upper edge of a window of the vehicle.

4 Claims, 4 Drawing Sheets

CONVERTIBLE TOP WEATHER STRIP

FIELD OF THE INVENTION

This invention relates to a sealing strip for an automotive vehicle convertible top to retard ingress of water into the passenger compartment during rainy weather or during the washing of the vehicle.

DESCRIPTION OF THE PRIOR ART

United States Patent Application Publication 2005/0127707 A1 discloses a sealing structure for an automotive vehicle of the convertible type in which the convertible top is provided with a sealing or weather strip that contacts the underside of the convertible top. The sealing strip has a downwardly extending arm that forms a C-shaped channel for collecting water. Unfortunately, water flowing toward the channel can overshoot the channel due to the momentum of the water that flows from the convertible top.

BRIEF DESCRIPTION OF THE INVENTION

According to the present invention there is provided an elastomeric sealing or weather strip for an automotive vehicle of the convertible type. The weather strip of this invention has a channel for receiving water coming off the convertible top. The weather strip of this invention also has an inwardly projecting bump or protrusion near its top to space major portions of the weather strip from the convertible top to thereby direct water by capillary action into the channel and away from an underlying closed window.

DETAILED DESCRIPTION OF THE INVENTION

Figure 1:
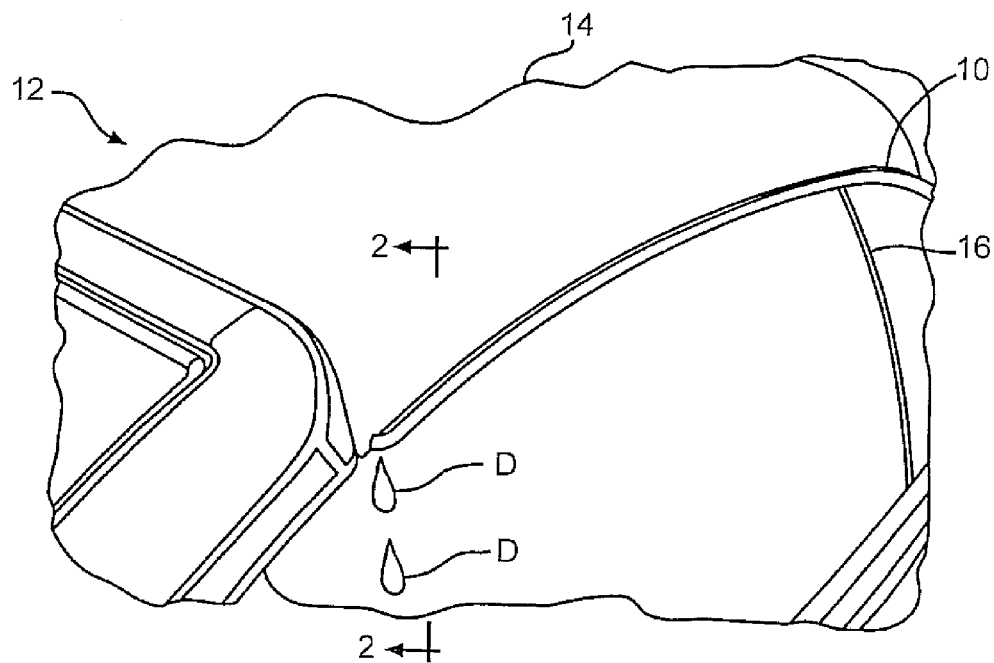
FIG. 1 is a fragmentary elevation view of a prior art vehicle with a convertible top having a sealing gasket or strip for sealing the vehicle against water ingress into the passenger compartment.
Figure 2:
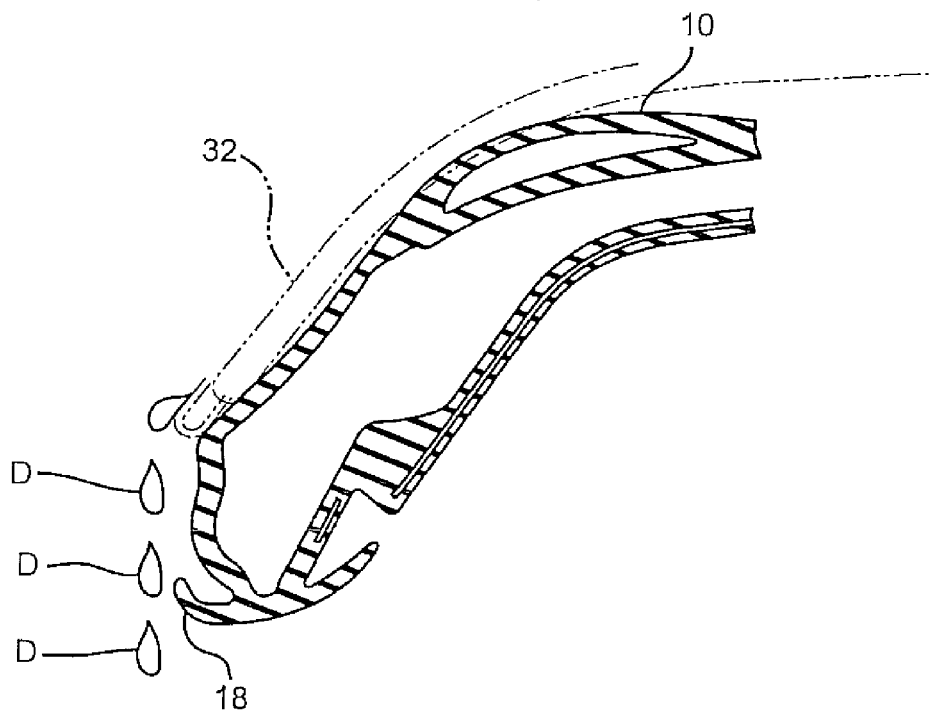
FIG. 2 is a sectional view taken on line 2-2 of FIG. 1.
Figure 3:
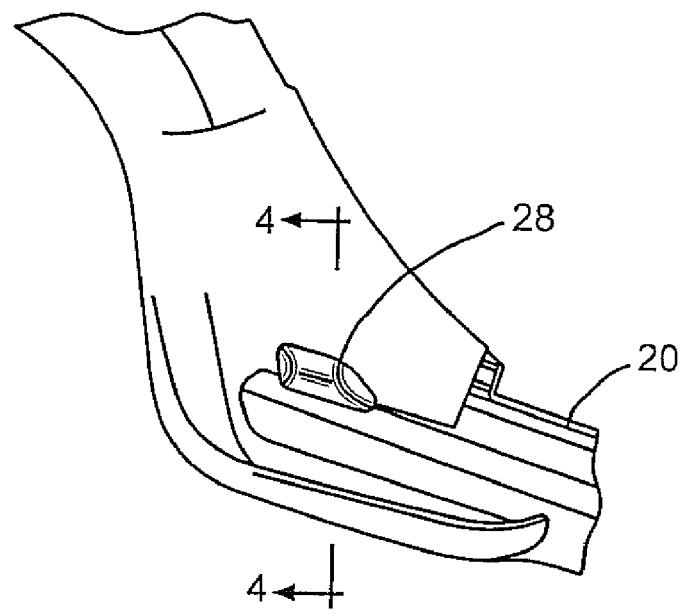
FIG. 3 is a fragmentary view of a sealing or weather strip according to an embodiment of the present invention.
Figure 4:
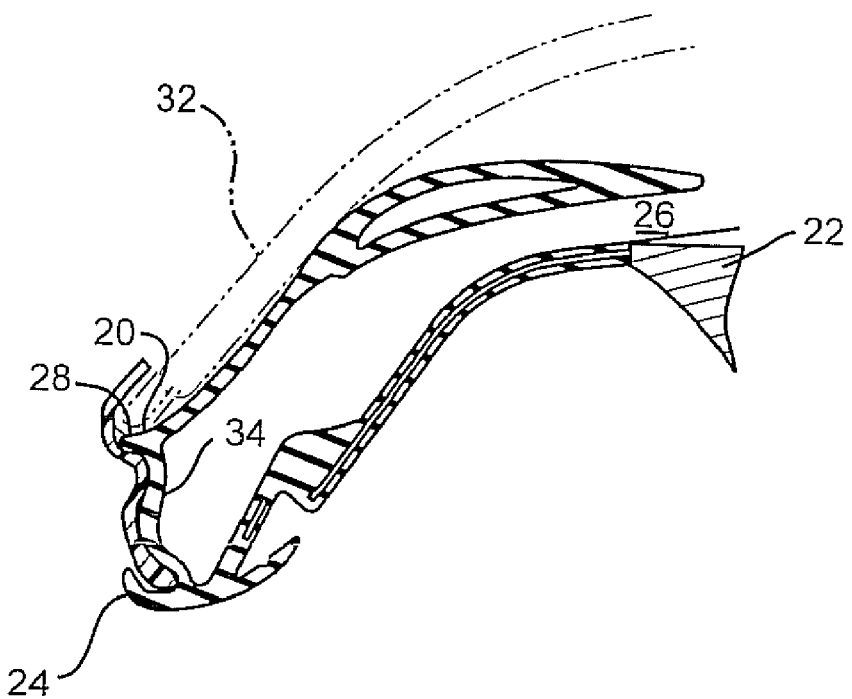
FIG. 4 is a sectional view taken on line 4-4 of FIG. 2.

As shown in FIG. 1, according to the prior art there is provided an elastomeric sealing or weather strip 10 for an automotive vehicle, shown generally by reference numeral 12. Tile sealing strip 10 engages an edge of a convertible top 14 above a side window 16 of the vehicle 19, and the sealing strip 10 is molded with an upwardly facing, generally C-shaped channel 18 to catch rain or car wash water coming off the convertible top 14, to thereby prevent the water from entering the passenger compartment of the vehicle 12 through an opening to the window 16, even if the window 16 is filly closed. Not all water coming off the convertible top 14 enters the channel 18, as shown by the drops D in FIGS. 1 and 2.

A sealing or weather strip 20 according to the present invention is shown in FIGS. 3-6, with a rigid plate 22 embedded therein for purposes of imparting rigidity to the sealing strip 20. The sealing strip 20 may be considered to have been molded in its illustrated complex configuration in a single, integral piece from an elastomeric material, and is provided with a lower, upwardly facing, generally C-shaped channel 24 to catch water flowing from an adjacent convertible top of an automotive vehicle. The sealing strip 20 is also provided with an upper, inwardly facing C-shaped channel 26.

Figure 5:
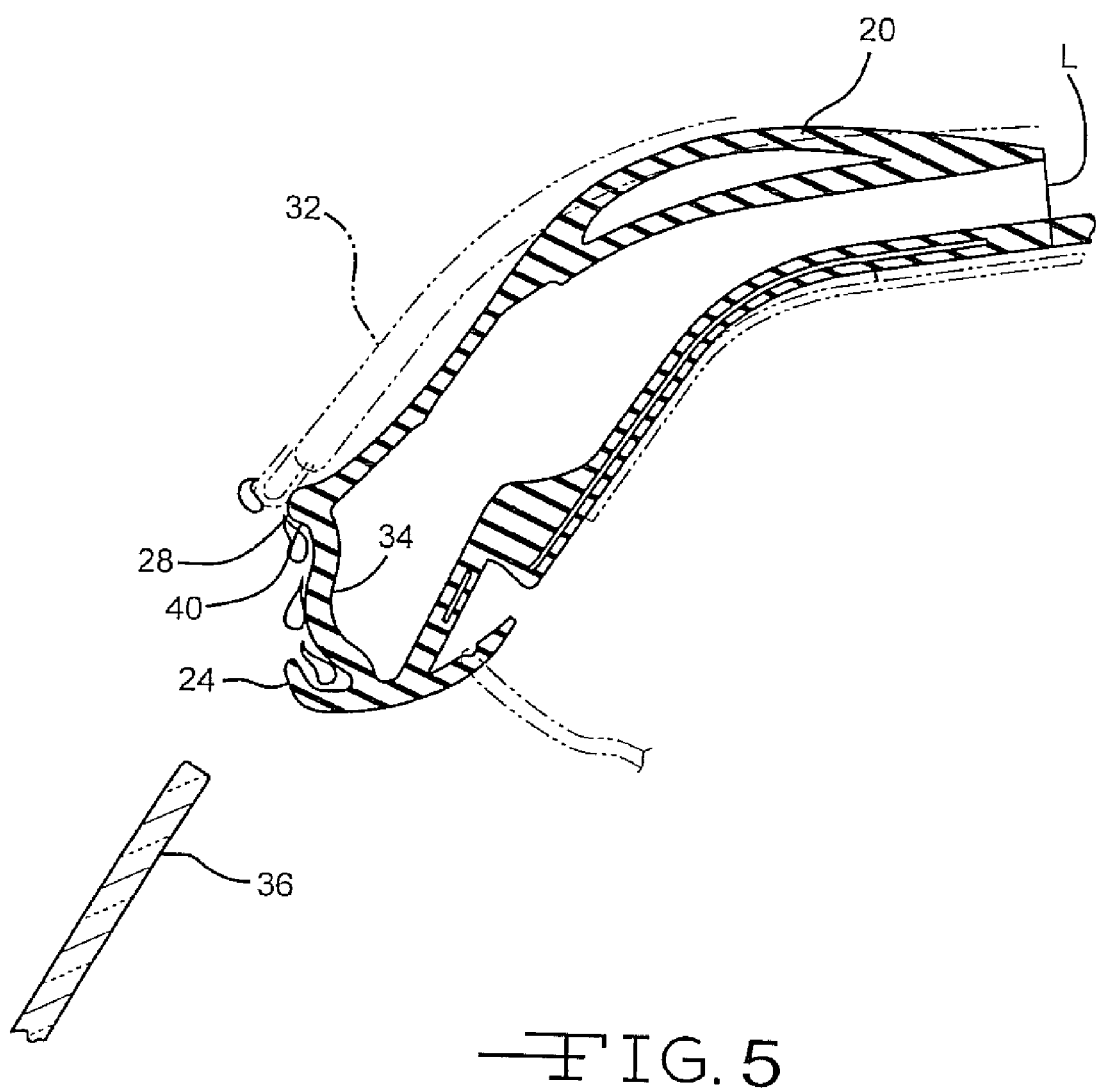
FIG. 5 is a view like FIG. 4 showing an adjacent window in an unclosed position and other adjoining structure in phantom.
Figure 6:
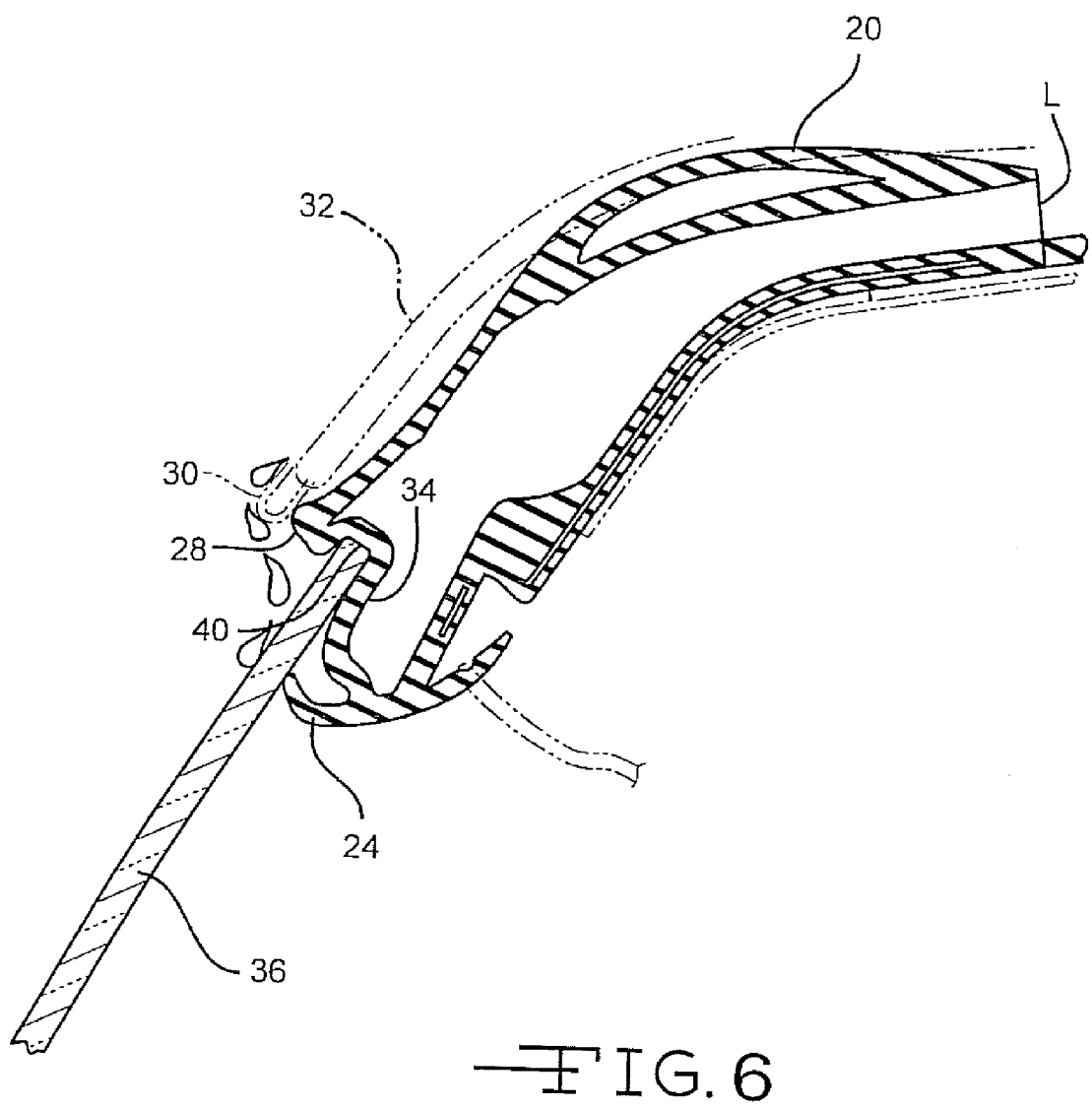
FIG. 6 is a view like FIG. 5 with the adjacent window in a closed position.

The sealing strip 20 is also provided with an outwardly projecting bump or protrusion 28 at a finite location along the length of the sealing strip 20 to engage a skirt member 30 of an associated frame of a convertible top 32, which is shown in phantom in FIGS. 5 and 6. The bump 28 serves to positively inwardly space portions of a leg portion 34 of the sealing strip 20 that leads into the channel 24 outwardly so that water flowing from the convertible top 32 will be able to flow into the channel 24 when an associated window 36 is an open position, as shown in FIG. 5, or onto an exterior of the window 36 as shown in FIG. 6. In the installed position of the weather strip 20, a closed door of an associated vehicle is indicated by a line L in FIGS. 5 and 6. The water flowing under the bump 28 will flow by capillary action along the exterior of the leg portion 34 of the sealing strip 20.

The portion of the sealing strip 20 that projects outwardly over the leg portion 34 forms a pocket 40 for sealingly receiving an upper edge of the window 36, as shown in FIG. 6. In the absence of the capillary action along the leg portion 34, water flowing from the convertible top 32 above the bump 28 would overflow the channel 24 of the sealing strip 20, especially in the window open position as shown in FIG. 5, as the bump 28 is vertically aligned with the channel 24.

Although the best mode contemplated by the inventors for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

The invention claimed is:

1. A resilient sealing strip for an automotive vehicle of the convertible type, the sealing strip being adapted to be attached to a convertible top of the automotive vehicle and to receive water flowing from the convertible top and prevent the water from entering a passenger compartment of the vehicle, the convertible top having a skirt member, the sealing strip comprising:

a downwardly depending leg having a substantial longitudinal extent;

an upwardly facing, generally C-shaped channel underlying said leg;

an outwardly projecting bump on said leg, said outwardly projecting bump having a longitudinal extent substantially less than the longitudinal extent of said leg, said bump serving to space a portion of said leg from an underlying portion of said convertible top to ensure that remaining portions of said channel are positioned to receive water flowing from the convertible top at least partly by capillary action along an exterior of said leg; and wherein the outwardly projecting bump is disposed at a finite location along the length of the sealing strip to engage the skirt member of the convertible top.

2. A sealing strip according to claim 1 wherein:
   said bump is positioned above other portions of said leg and is spaced above said channel and is vertically aligned with at least a major portion of said channel.

3. A sealing strip according to claim 2 wherein:
   said leg, said channel and said bump are formed integrally in a single piece from an elastomeric material.

4. A sealing strip according to claim 2 wherein:
   said leg is adapted to form a pocket for sealingly receiving an upper edge of a window of the vehicle.

* * * * *

UNITED STATES PATENT AND TRADEMARK OFFICE
CERTIFICATE OF CORRECTION

PATENT NO.       : 7,438,344 B2                              Page 1 of 1
APPLICATION NO.  : 11/566867
DATED            : October 21, 2008
INVENTOR(S)      : Paxton S. Williams et al.

It is certified that error appears in the above-identified patent and that said Letters Patent is hereby corrected as shown below:

Column 1, line 52, replace "tile" with --the--

Column 1, line 53, replace "19" with --12--

Column 1, line 58, replace "filly" with --fully--

Signed and Sealed this

Twenty-fourth Day of March, 2009

JOHN DOLL
*Acting Director of the United States Patent and Trademark Office*